US009622104B2

(12) United States Patent
Lee et al.

(10) Patent No.: US 9,622,104 B2
(45) Date of Patent: Apr. 11, 2017

(54) METHOD AND APPARATUS FOR TRANSMITTING CELL LOAD INFORMATION IN WIRELESS COMMUNICATION SYSTEM

(71) Applicant: LG Electronics Inc., Seoul (KR)

(72) Inventors: Insun Lee, Seoul (KR); Daewook Byun, Seoul (KR); Jian Xu, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/889,346

(22) PCT Filed: May 9, 2014

(86) PCT No.: PCT/KR2014/004148
§ 371 (c)(1),
(2) Date: Nov. 5, 2015

(87) PCT Pub. No.: WO2014/182118
PCT Pub. Date: Nov. 13, 2014

(65) Prior Publication Data
US 2016/0119809 A1    Apr. 28, 2016

Related U.S. Application Data

(60) Provisional application No. 61/821,661, filed on May 9, 2013.

(51) Int. Cl.
| H04W 72/00 | (2009.01) |
| H04W 28/02 | (2009.01) |
| H04W 16/08 | (2009.01) |
| H04W 92/20 | (2009.01) |
| H04W 88/16 | (2009.01) |

(52) U.S. Cl.
CPC ........... *H04W 28/02* (2013.01); *H04W 16/08* (2013.01); *H04W 28/0205* (2013.01); *H04W 88/16* (2013.01); *H04W 92/20* (2013.01)

(58) Field of Classification Search
CPC ..... H04W 24/10; H04W 24/02; H04W 28/08; H04W 72/0426; H04W 16/08; H04W 24/04; H04W 28/02; H04W 28/0289; H04W 52/343; H04W 72/0433; H04W 72/1252; H04L 43/062; H04L 43/0882
USPC ........................................................ 455/453
See application file for complete search history.

(56) References Cited

U.S. PATENT DOCUMENTS

| 2011/0171952 A1* | 7/2011 | Niu .................... H04L 43/0882 455/422.1 |
| 2011/0244866 A1 | 10/2011 | Yamamoto et al. |
| 2012/0064896 A1 | 3/2012 | Guo et al. |

(Continued)

FOREIGN PATENT DOCUMENTS

KR    1020090112323    10/2009

*Primary Examiner* — Kwasi Karikari
(74) *Attorney, Agent, or Firm* — Dentons US LLP

(57) ABSTRACT

A method and apparatus for transmitting cell load information in a wireless communication system is provided. A first eNodeB (eNB) of a first system receives cell load information of a cell in a second system, from a radio network controller (RNC) of the second system, and transmits the received cell load information to at least one second eNB of the first system. The first system may be an evolved UMTS terrestrial radio access network (E-UTRAN), and the second system may be an UTRAN.

15 Claims, 15 Drawing Sheets

(56) References Cited

U.S. PATENT DOCUMENTS

| | | |
|---|---|---|
| 2012/0094669 A1 | 4/2012 | Hapsari et al. |
| 2012/0282931 A1 | 11/2012 | Giustina et al. |
| 2013/0095842 A1* | 4/2013 | Jia .................. H04W 28/16 455/452.1 |

* cited by examiner

FIG. 3
(Prior Art)
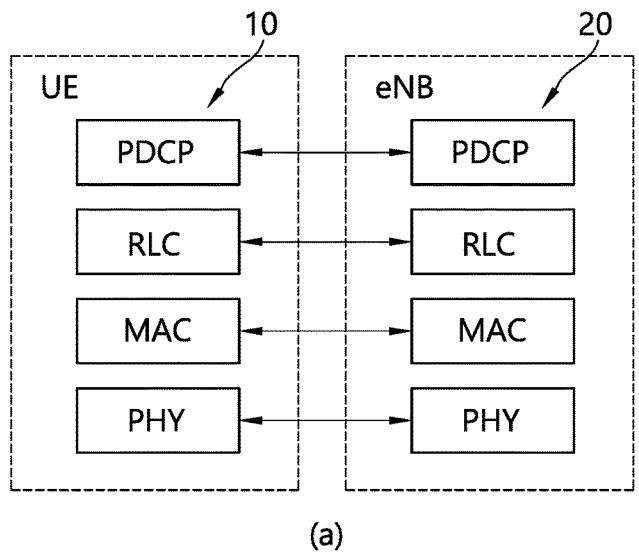
(a)
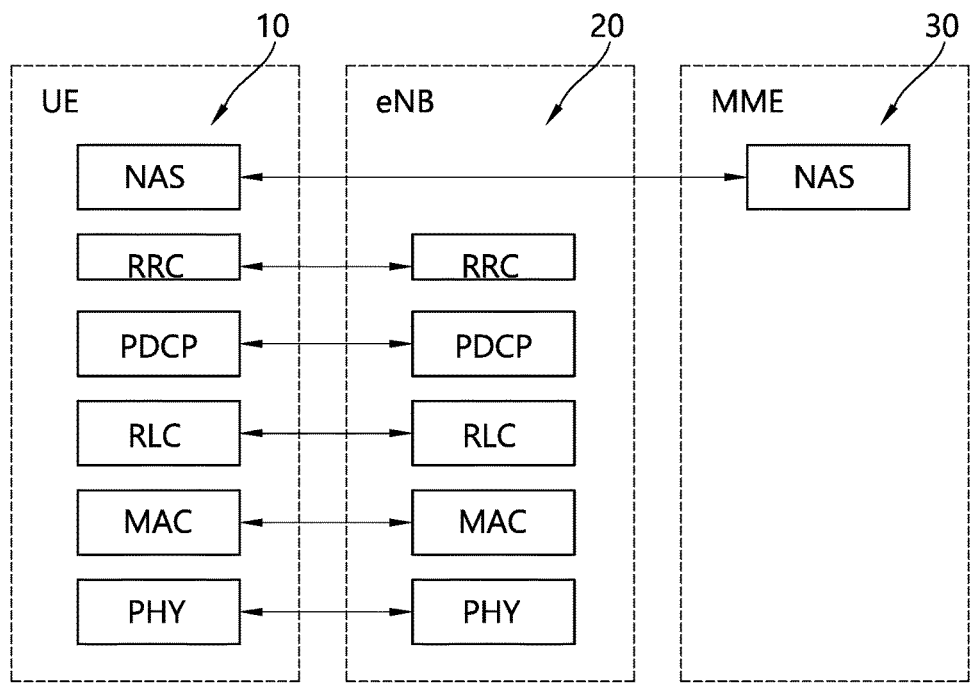
(b)

METHOD AND APPARATUS FOR TRANSMITTING CELL LOAD INFORMATION IN WIRELESS COMMUNICATION SYSTEM

This application is a 35 USC §371 National Stage entry of International Application No. PCT/KR2014/004148 filed on May 9, 2014, and claims priority to U.S. Provisional Application No. 61/821,661 filed on May 9, 2013, all of which are hereby incorporated by reference in their entireties as if fully set forth herein.

BACKGROUND OF THE INVENTION

Field of the Invention

The present invention relates to wireless communication, and more particularly, to a method and apparatus for transmitting cell load information in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As shown in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As shown, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As shown, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer shown in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As shown in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As shown in FIG. 3(b), the RLC and MAC layers (terminated in an eNodeB 20 on the network side) perform the same functions for the control plane. As shown, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As shown in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Long-term coexistence is likely to occur between UMTS/high speed packet access (HSPA) and LTE in one operator's network which places interworking mechanism into a very important position. Currently inter-radio access technology (RAT) handover between UMTS/HSPA and LTE uses relocation procedures. Several small evolutions have been done to make these procedure work better from LTE Rel-8.

However, extensive handover messages and excessive signaling loads in current UMTS/HSPA and LTE interworking may lead to low network efficiency and suboptimal user experience in practical deployments. Such problems could be even more critical in LTE initial deployments (limited LTE coverage) or hotspot type of deployments, leading to frequent inter-RAT handovers and other interoperation procedures.

In order to facilitate multi-RAT deployment and operation, there is a strong need to investigate possible mechanism for seamless UMTS/HSPA and LTE interworking. Besides the enhancement of existing mechanisms, interoperation between two RATs handled by a radio access network (RAN) would be a promising approach in order to benefit mobility performance and reduce impact and resource burden on a core network. Possible performance benefits from RAN level interworking needs to be balanced against the additional impact on network, with reasonable cost guaranteed.

In a situation that the LTE systems are deployed with its capability of carrying explosive mobile traffic, the LTE systems may be deployed in order to improve capacity of specific areas. For this, it is anticipated that pico cells will be deployed or small cells with low power nodes will be deployed for covering hotspot areas. A study item for interworking enhancement of UMTS-LTE has been discussed, and scenarios in which LTE hotspots are deployed in UMTS macro coverage may be discussed. That is, a scenario that E-UTRAN small cells are deployed in traffic hotspots (densely and sparsely) for capacity improvement while a UTRAN macro cell provides full overlapping macro coverage and vice versa may be discussed for interworking enhancement of UMTS-LTE.

An efficient method for interworking of a UMTS macro cell and an LTE small cell may be required.

SUMMARY OF THE INVENTION

The present invention provides a method and apparatus for transmitting cell load information in a wireless communication system. The present invention provides a method for reducing network loads in interworking of a universal mobile telecommunications system (UMTS) system and a long-term evolution (LTE) system when LTE small cells and/or pico cells are deployed in coverage of a UMTS macro cell.

In an aspect, a method for transmitting, by a first eNodeB (eNB) of a first system, cell load information in a wireless communication system is provided. The method includes receiving cell load information of a cell in a second system, from a radio network controller (RNC) of the second system, and transmitting the received cell load information to at least one second eNB of the first system.

The cell load information of the cell in the second system may be received using a mobility management entity (MME) direct information transfer message via an S1 interface, and the cell load information of the cell in the second system may be received from the RNC via an MME and a serving GPRS support node (SGSN).

The cell load information of the cell in the second system may include an identifier (ID) of the cell in the second system.

The cell load information of the cell in the second system may include an ID of the at least one second eNB of the first system.

The received cell load information may be transmitted using a resource status response message or a using a resource status update message via an X2 interface.

The method may further include receiving a resource status request message including an ID of the cell in the second system from the at least one second eNB of the first system, and transmitting a resource status response message indicating whether the cell load information is available.

The resource status request message may be received via an X2 interface, and the resource status response message may be transmitted via the X2 interface.

The resource status request message may include a request for reporting of the cell load information in an event-triggered manner.

The resource status response message may include the cell load information of the cell in the second system if the cell load information is available.

In another aspect, a first eNodeB (eNB) of a first system in a wireless communication system is provided. The first eNB includes a radio frequency (RF) unit for transmitting or receiving a radio signal, and a processor coupled to the RF unit, and configured to receive cell load information of a cell in a second system, from a radio network controller (RNC) of the second system, and transmit the received cell load information to at least one second eNB of the first system.

Signaling overhead of a network for acquiring cell information between heterogeneous systems can be reduced when LTE small cells and/or pico cells are deployed in coverage of a UMTS macro cell.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

On top of an existing macro UMTS system deployment, an LTE system may tend to be deployed as a form of small cells such as pico cells in hotspot areas as an initial type of deployment. By deploying the small cells in a hotspot area, supporting higher capacity for the heterogeneous traffic demand for certain area may result in better performance for users.

Types of hotspots may vary according to density of the small cells or where the hotspot area is located. From the perspective of density for hotspot coverage, the small cells can be deployed densely or sparsely. Also the hotspot area can be formed in outdoor areas such as train stations or busy urban areas, or indoor areas such as, airports, shopping malls, and office buildings.

Figure 1:
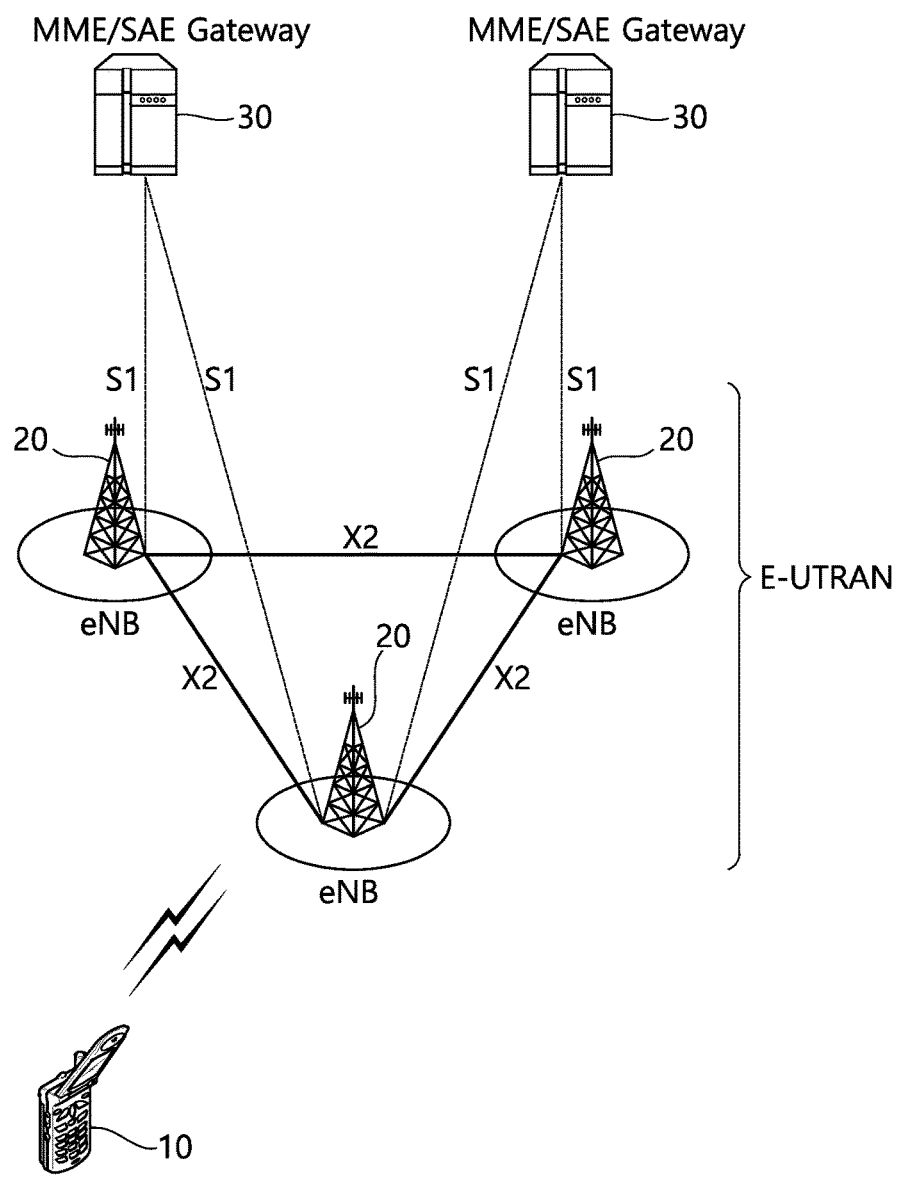
FIG. 1 shows network structure of an evolved universal mobile telecommunication system (E-UMTS).
Figure 2:
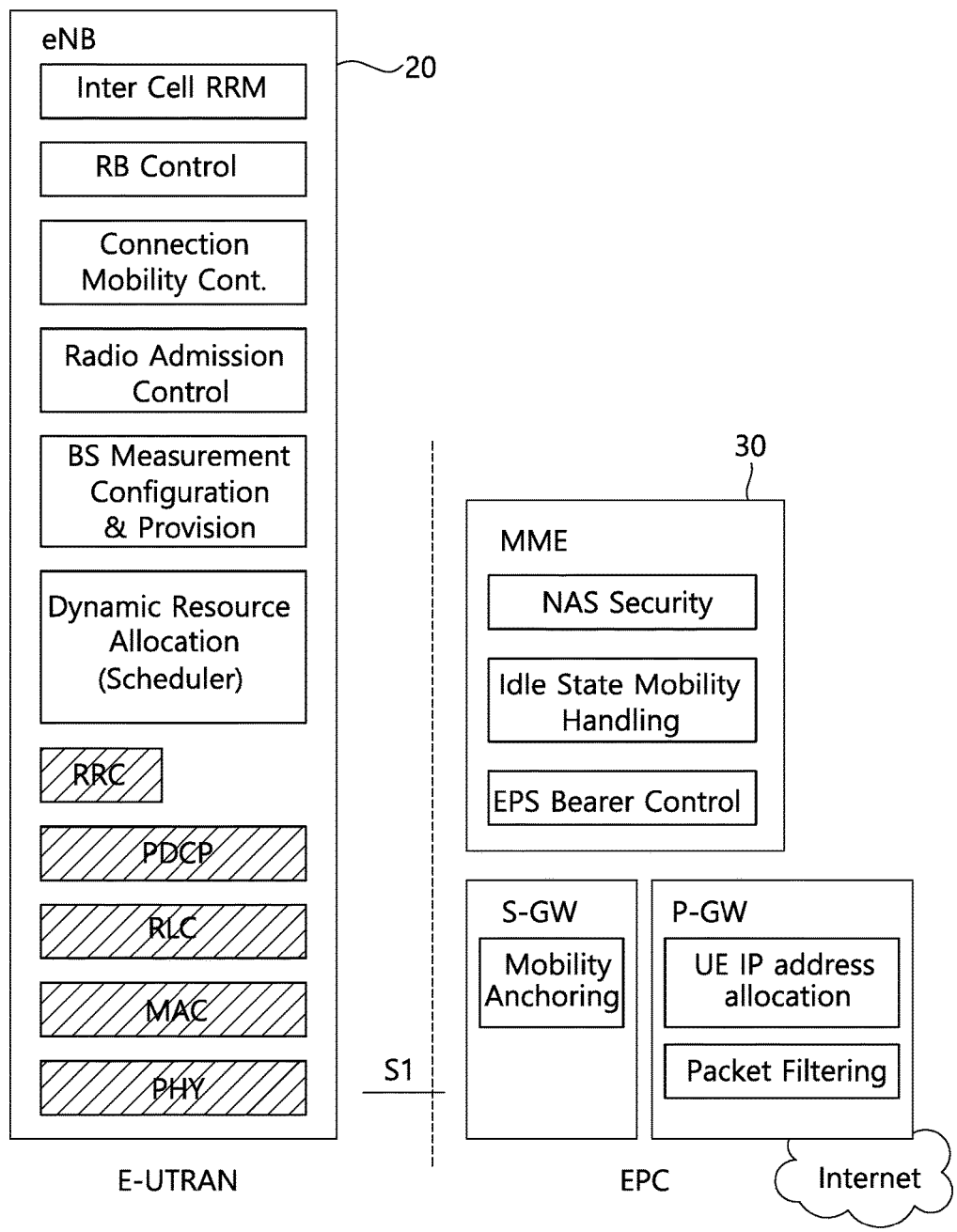
FIG. 2 shows architecture of a typical E-UTRAN and a typical EPC.
Figure 4:
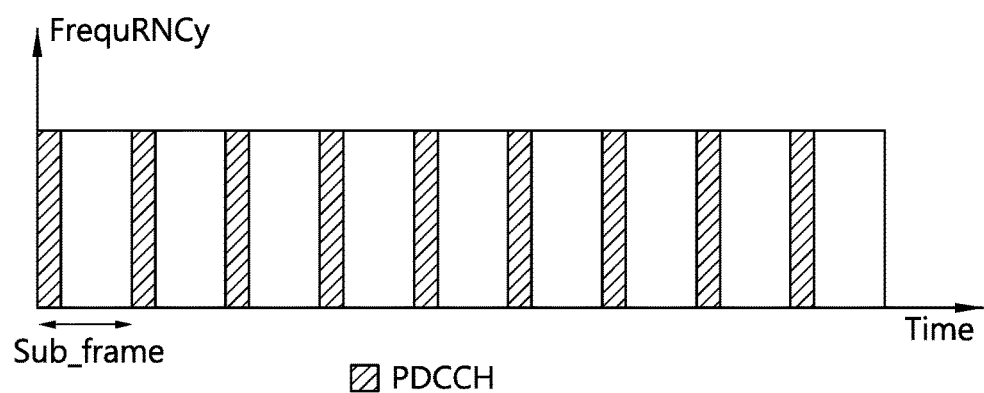
FIG. 4 shows an example of structure of a physical channel.
Figure 5:
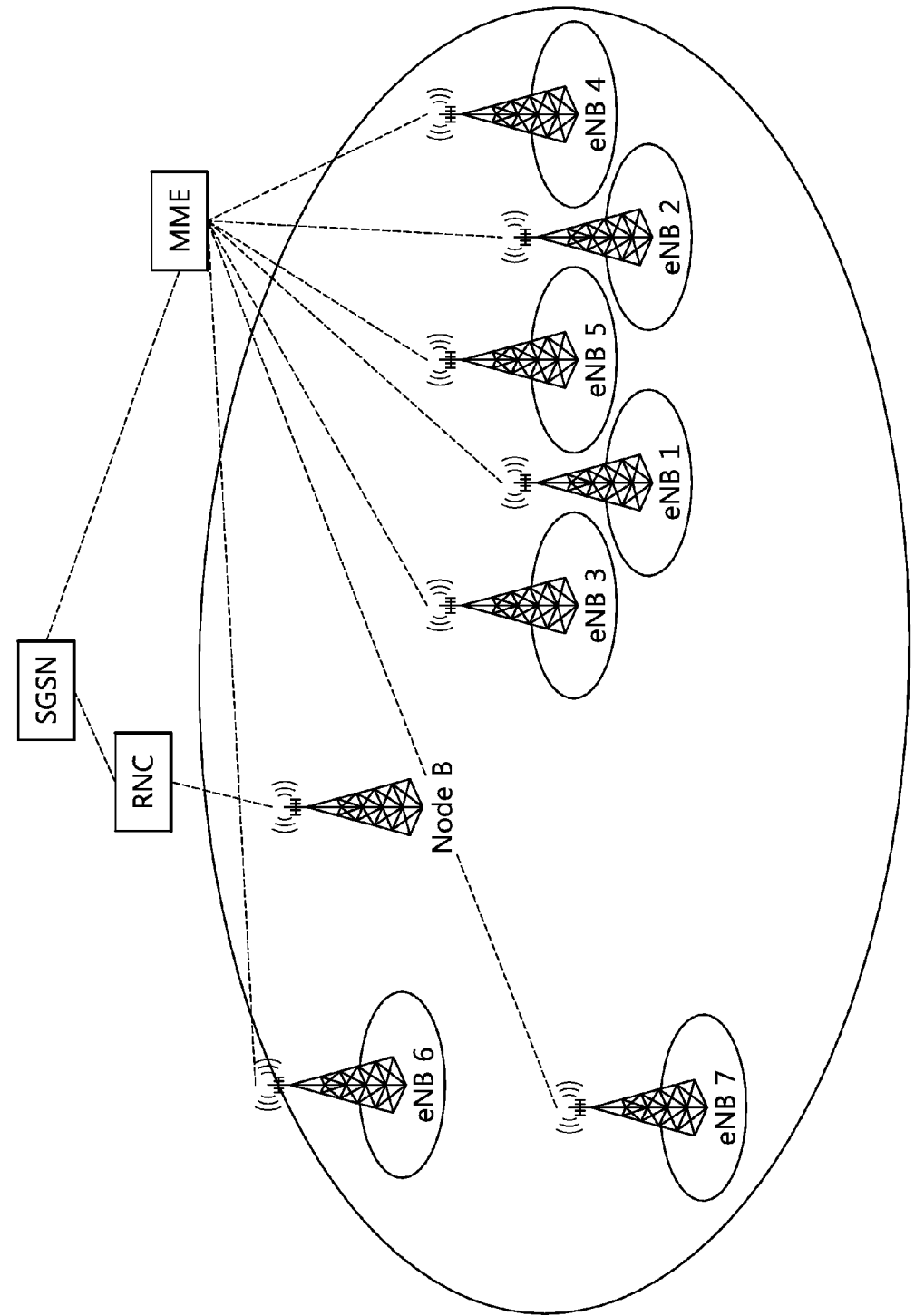
FIG. 5 shows an example of hotspot deployment of LTE small cells with a UMTS macro cell.

FIG. 5 shows an example of hotspot deployment of LTE small cells with a UMTS macro cell.

Referring to FIG. 5, a UMTS Node B provides a UMTS macro cell. The Node B is connected with a radio network controller (RNC). Each of eNodeB (eNB)1 to eNB7 provides a hotspot LTE small cell, respectively. eNB1 to eNB5 are deployed densely in a hotspot area. eNB6 and eNB7 are deployed sparsely in a hotspot area. Each eNB is connected with a mobility management entity (MME). The MME and the RNC is connected via a serving GPRS support node (SGSN).

One of major purposes of hotspot deployment is to boosting up the capacity for the corresponding areas. The indoor data offloading reduces interference with outdoor macro cells, and it can also provide reduction in battery consumption. However, for efficient use of available spectrum, traffic data steering considering load information of macro and pico cells needs to be considered. In the example described in FIG. 5, load balancing between the UMTS macro cell and the hotspot LTE small cells is to be considered for efficient use of overlay networks.

Currently, load balancing for inter-radio access technology (RAT) can be provided using radio access network (RAN) information management (RIM) function for inter-RAT in a self-optimization network (SON). In this procedure, load information is transferred between RAN nodes via a core network.

Figure 6:
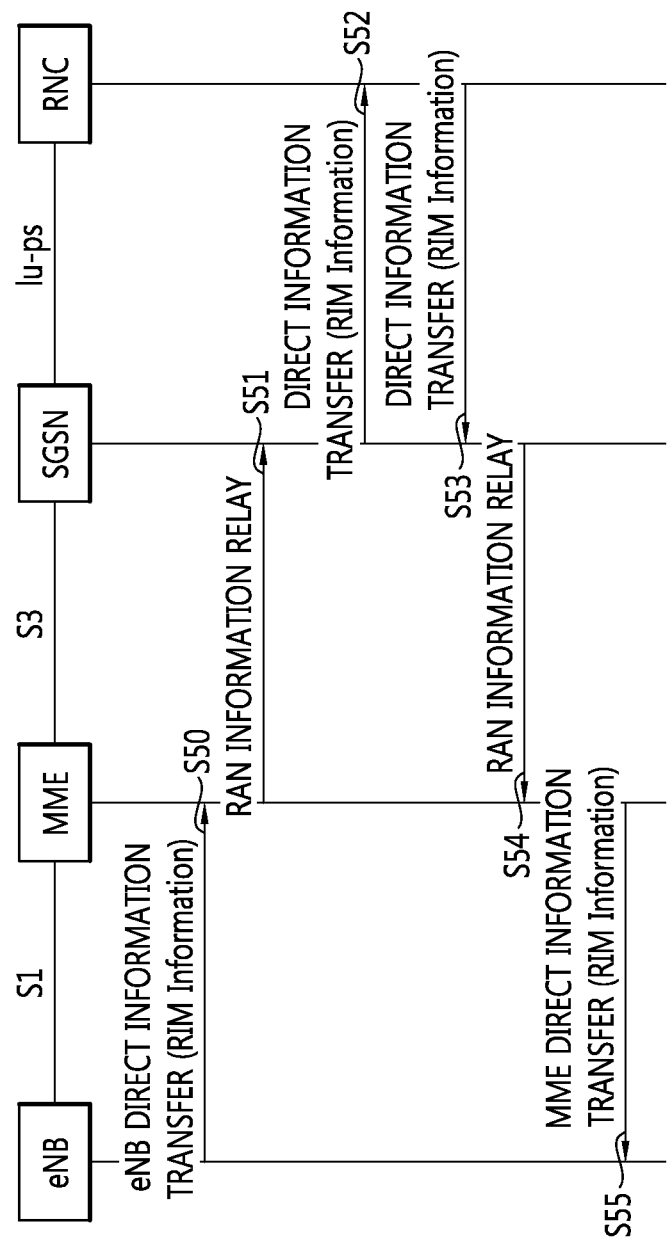
FIG. 6 shows an example of a current inter-RAT RIM procedure.

FIG. 6 shows an example of a current inter-RAT RIM procedure.

At step S50, an eNB transmits an eNB direct information transfer message including RIM information to an MME via the S1 interface. At step S51, the MME transmits an RAN information relay message including the RIM information to an SGSN via the S3 interface. At step S52, the SGSN transmits a direct information transfer message including the RIM information to an RNC via Iu-ps interface. At step S53, the RNC transmits a direct information transfer message including the RIM information to the SGSN via Iu-ps interface. At step S54, the SGSN transmits an RAN information relay message including the RIM information to the MME via the S3 interface. At step S55, the MME transmits an MME direct information transfer message including the RIM information to the eNB via the S1 interface.

However, when the LTE small cells are deployed densely in hotspot areas or may small cells such as pico cells are deployed, heavy signaling overhead may be caused with current RIM procedure. For example, referring to FIG. 5 described above, it is assumed that eNB1, eNB2 and eNB3, among eNB1 to eNB5 deployed in a hotspot area, request load information to the RNC. In this case, each eNB transmits the eNB direct information transfer message to the MME, and therefore, heavy signaling overhead may occur.

Figure 7:
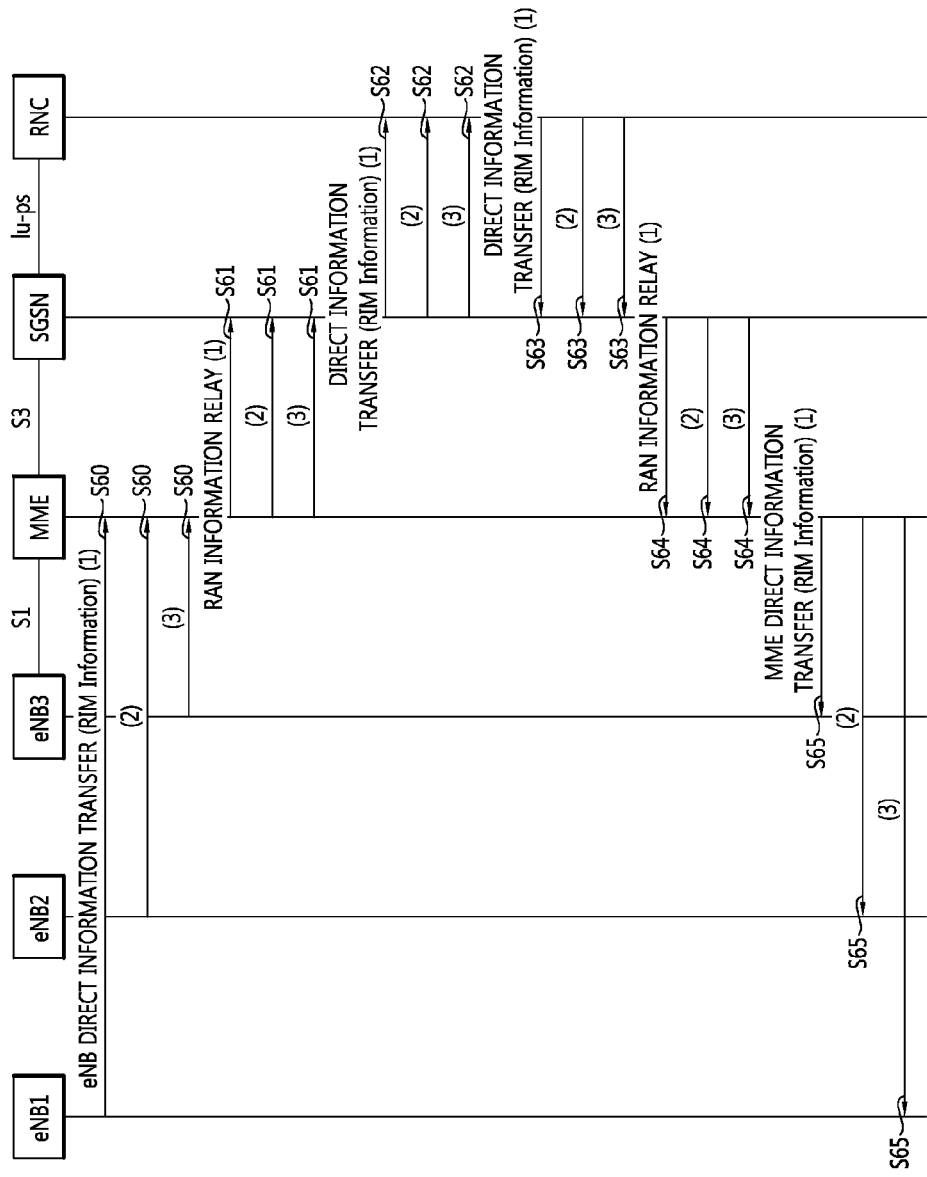
FIG. 7 shows an example of singling overhead according to a current inter-RAT RIM procedure.

FIG. 7 shows an example of singling overhead according to a current inter-RAT RIM procedure.

Referring to FIG. 7, at step S60, eNB1, eNB2, and eNB3 transmit eNB direct information transfer messages including RIM information to the MME via the S1 interface, respectively. At step S61, the MME transmits RAN information relay messages including the RIM information, for the eNB1, eN2, and eNB3, to the SGSN via the S3 interface. At step S62, the SGSN transmits direct information transfer messages including the RIM information, for the eNB1, eN2, and eNB3, to the RNC via Iu-ps interface. At step S63, the RNC transmits direct information transfer messages including the RIM information, for the eNB1, eN2, and eNB3, to the SGSN via Iu-ps interface. At step S64, the SGSN transmits RAN information relay messages including the RIM information, for the eNB1, eN2, and eNB3, to the MME via the S3 interface. At step S65, the MME transmits MME direct information transfer messages including the RIM information to the eNB1, eN2, and eNB3 via the S1 interface, respectively.

As describe above, as the number of eNBs increases, signaling overhead increases linearly. Signaling overhead can cause overload on a network. In addition, overload on a network may be increased, since each eNB transmits the same message to the MME for acquiring the same information.

Figure 8:
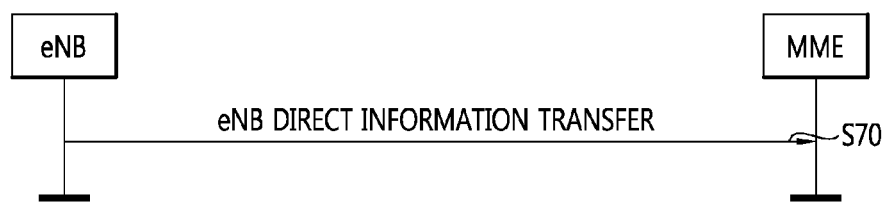
FIG. 8 shows an eNB direct information transfer procedure.

FIG. 8 shows an eNB direct information transfer procedure. It may be referred to Section 8.13 of 3GPP TS 36.413 V11.2.0 (2012-12).

Referring to FIG. 8, at step S70, the eNB transmits an eNB direct information transfer message to the MME. The purpose of the eNB direct information transfer procedure is to transfer RAN information from the eNB to the MME in unacknowledged mode. The MME does not interpret the transferred RAN information.

Figure 9:
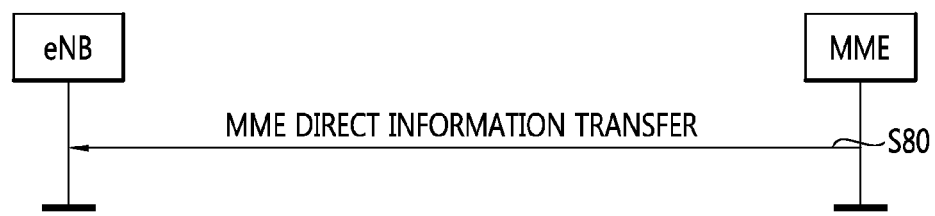
FIG. 9 shows an MME direct information transfer procedure.

FIG. 9 shows an MME direct information transfer procedure. It may be referred to Section 8.14 of 3GPP TS 36.413 V11.2.0 (2012-12).

Referring to FIG. 9, at step S80, the MME transmits an MME direct information transfer message to the eNB. The purpose of the MME direct information transfer procedure is to transfer RAN information from the MME to the eNB in unacknowledged mode. This procedure uses non-user equipment (UE) associated signaling.

Figure 10:
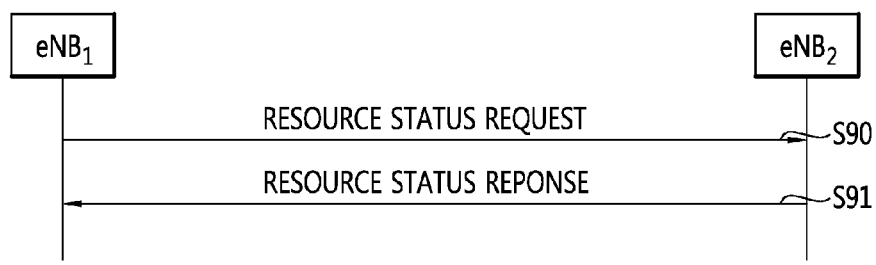
FIG. 10 shows a resource status reporting initiation procedure.

FIG. 10 shows a resource status reporting initiation procedure. It may be referred to Section 8.3.6 of 3GPP TS 36.423 V11.2.0 (2012-09).

Referring to FIG. 10, at step S90, the eNB1 transmits a resource status request message to the eNB2. At step S91, the eNB2 transmits a resource status response message to the eNB1 in order to indicate that the eNB2 initiates the measurement as requested by the eNB1. This procedure is used by an eNB to request the reporting of load measurements to another eNB. The procedure uses non UE-associated signaling.

Figure 11:
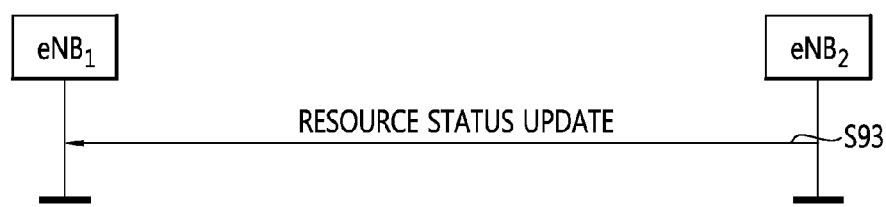
FIG. 11 shows a resource status reporting procedure.

FIG. 11 shows a resource status reporting procedure. It may be referred to Section 8.3.7 of 3GPP TS 36.423 V11.2.0 (2012-09).

Referring to FIG. 11, at step S93, the eNB2 transmits a resource status update message to the eNB1. This procedure is initiated by the eNB2 to report the result of measurements admitted by the eNB2 following a successful resource status reporting initiation procedure. The procedure uses non UE-associated signaling. The eNB2 shall report the result of the admitted measurements in a resource status update message. The admitted measurements are the measurements that were successfully initiated during the preceding resource status reporting initiation procedure.

Currently, RIM procedures may be used for acquiring load information of other UTRAN. In the RIM procedures, an inter-RAT load information request message is used on an S1 interface, and the inter-RAT load information request message may include a SON transfer request container including an identifier (ID) of a target cell from which load information is to be acquired. More specifically, the target cell ID may be included in an RIM information IE (information element) including a base station system GPRS protocol (BSSGP) RIM protocol data unit (PDU), and may be delivered transparently between the MME and the SGSN. Accordingly, upon receiving the eNB direct information transfer message, the MME delivers the same to the SGSN.

However, when each eNB requests to the MME for acquiring inter-RAT load information, the requests from each eNB may be overlapped, and the MME may also deliver the overlapped requests to the SGSN. Accordingly, as the number of eNBs, which provide small cells and/or pico cells and connected to the MME, increases, signaling overhead may increase.

To avoid overlapping of messages and signaling overhead, a method for reducing overlapping of messages on an S1 interface may be proposed. For this, a method for reducing overload on a core network by sharing inter-RAT load information between eNBs, which provide small cells and/or pico cells, via an X2 interface without aid of the MME may be proposed.

Hereinafter, a method for transmitting cell load information efficiently without network overload may be proposed according to an embodiment of the present invention, when nodes, which have relatively small coverage, are deployed in coverage of UMTS macro cell. According to another embodiment of the present invention, when LTE pico cells and/or LTE small cells are deployed in coverage of LTE macro cell, a method for transmitting cell load information may be proposed.

According to the embodiments of the present invention, heavy signaling between a core network and eNBs/MME can be reduced, when information on cells including load information are exchanged between different RATs in interworking of the UMTS and LTE. The information on cells may include load information and various types of information for interworking of the UMTS and LTE.

Figure 12:
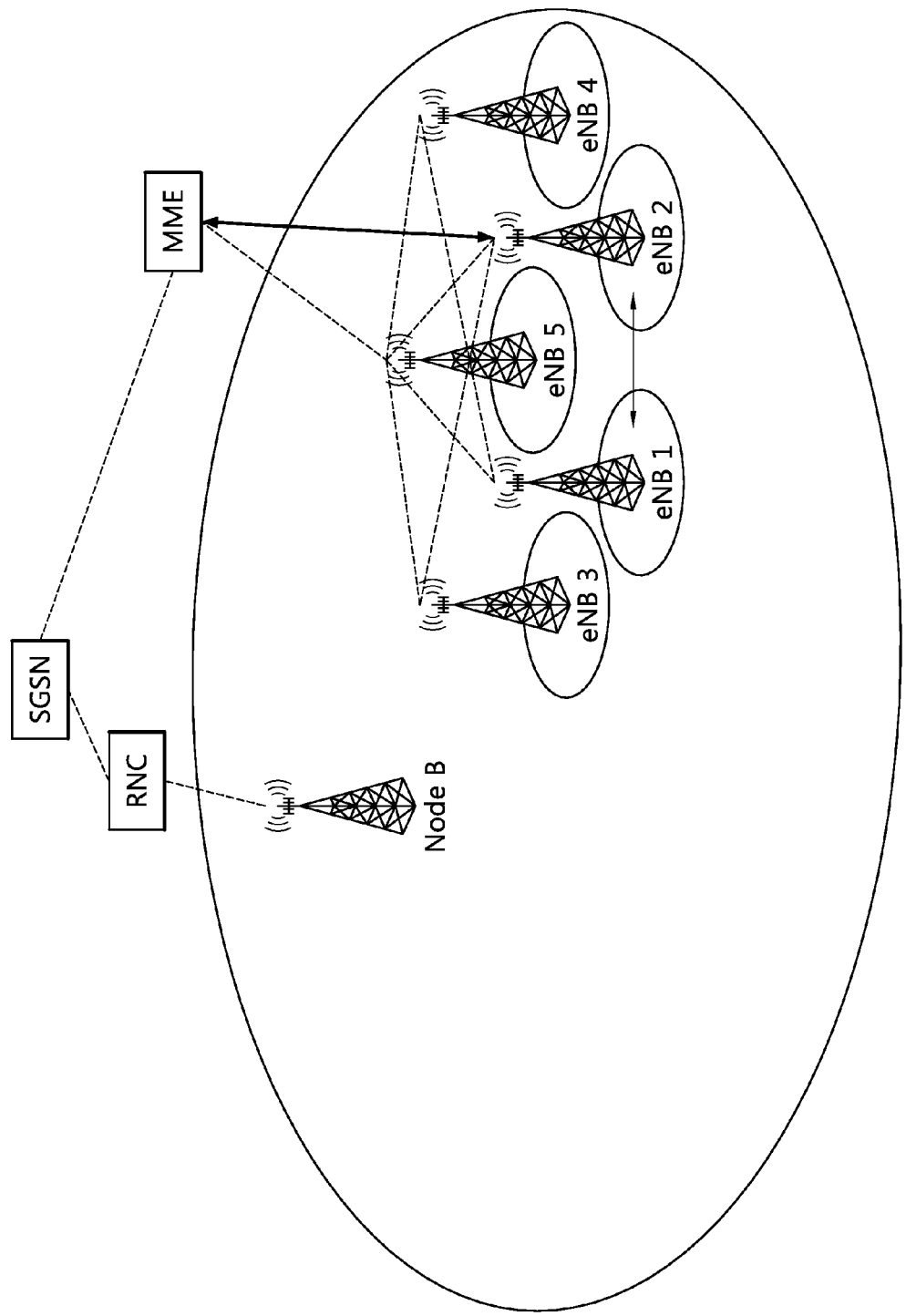
FIG. 12 shows an example of interface for sharing inter-RAT information according to an embodiment of the present invention.

FIG. 12 shows an example of interface for sharing inter-RAT information according to an embodiment of the present invention.

Referring to FIG. 12, the UMTS Node B provides the UMTS macro cell. The Node B is connected with the RNC. Each of eNB1 to eNB5 provides the hotspot LTE small cell, respectively. eNB1 to eNB5 are deployed densely in the hotspot area. eNBs are connected with each other via the X2 interface. Each eNB is connected with the MME via the S1 interface. The MME and the RNC is connected via the SGSN.

According to the embodiment of the present invention, an eNB may share the inter-RAT load information with a neighbor eNB via the X2 interface. The eNB1 may ask to the eNB2 whether the eNB2 has the inter-RAT load information, before requesting the inter-RAT load information from the MME. When eNBs perform resource status update procedure via the X2 interface, the inter-RAT load information may be included in a message related to the resource status reporting initiation procedure or the resource status reporting procedure.

Figure 13:
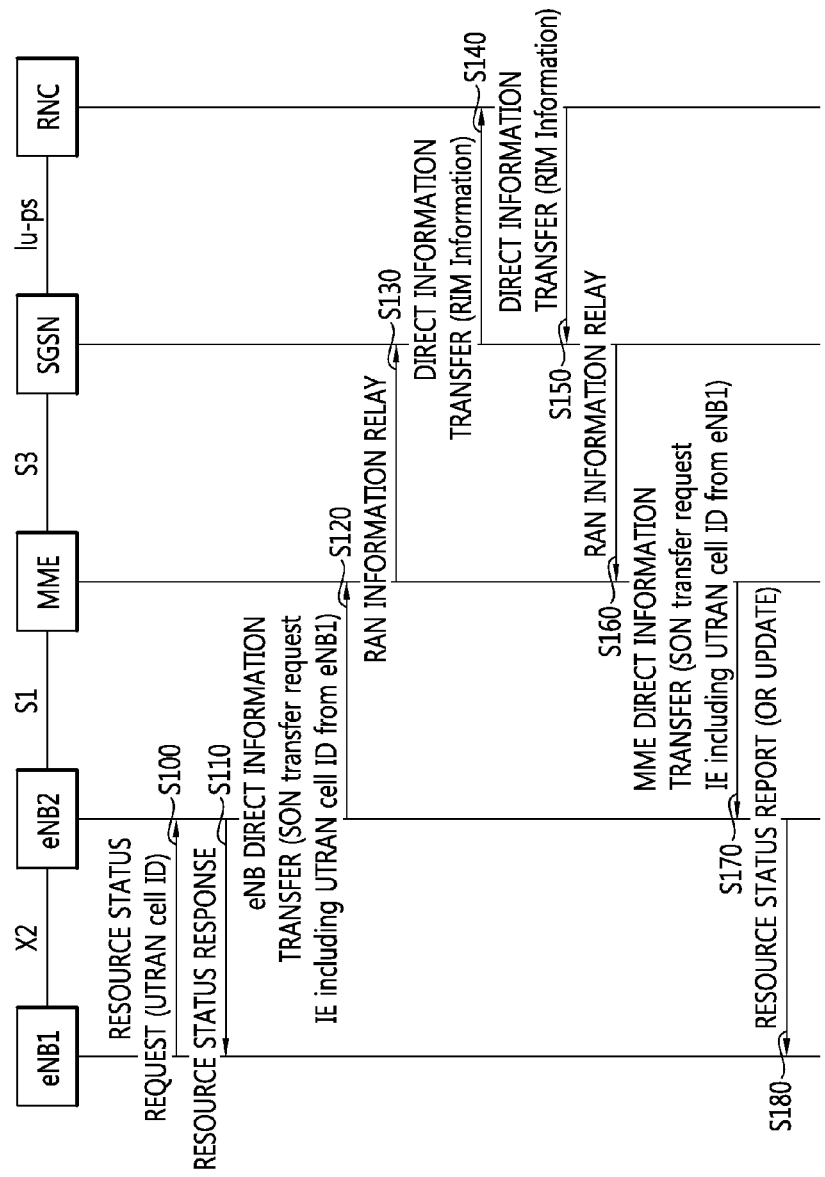
FIG. 13 shows an example of transmitting load information according to an embodiment of the present invention.

FIG. 13 shows an example of transmitting load information according to an embodiment of the present invention.

At step S100, the eNB1 transmits a resource status request message to the eNB2 in order to acquire UTRAN cell load information, instead of transmitting an eNB direct transfer message to the MME. The resource status request message may be transmitted via the X2 interface. The resource status request message may include an ID of the UTRAN target cell from which the load information is to be acquired. The resource status request message may include a request for reporting of the UTRAN cell load information in an event-triggered manner. For reporting of the UTRAN cell load information in an event-triggered manner, cell load may be divided to a plurality of load levels, and the UTRAN cell load information may be reported when the cell load changes across the load levels.

At step S110, upon receiving the resource status request message, the eNB2 transmits a resource status response message to the eNB1. The resource status response message may be transmitted via the X2 interface. The eNB2 may inform the eNB1 whether the eNB2 can provide the UTRAN cell load information requested by the eNB1, before requesting the UTRAN cell load information from the MME. Whether the eNB2 can provide the UTRAN cell load information requested by the eNB1 may be indicated by the presence of the UTRAN cell ID in a measurement initiation result included in the resource status response message. For example, if the UTRAN cell ID is included in the measurement initiation result, it indicates that the eNB2 can provide the UTRAN cell load information requested by the eNB1. Or, the eNB2 may inform the eNB1 that the eNB2 will request the UTRAN cell load information from the MME. If the UTRAN cell load information is not available at the eNB2, the eNB2 may indicate that using a failure cause.

In the description above, the resource status request message and the resource status response message, which are previously defined in the X2 interface, are used, but the embodiment of the present invention is not limited thereto. The eNB1 and eNB2 may use a newly defined message. That is, the eNB1 may transmit a newly-defined load information request message to the eNB2 including the UTRAN cell ID, and the eNB2 may transmits a newly-defined load information response message to the eNB1.

If the eNB2 does not have the UTRAN cell load information requested by the eNB1, the eNB2 may request the UTRAN cell load information from the MME. For this, at step S120, the eNB2 transmits an eNB direct information transfer message to the MME. The eNB direct information transfer message may be transmitted via the S1 interface. The eNB direct information transfer message may include the UTRAN cell ID. Specifically, the eNB direct information transfer message may include an SON transfer request IE including the UTRAN cell ID.

By the conventional RIM procedures, the eNB2 may acquire the UTRAN cell load information. More specifically, at step S130, upon receiving the eNB direct information transfer message, the MME transmits an RAN information relay to the SGSN. At step S140, upon receiving the RAN information relay message, the SGSN transmits a direct information transfer message to the RNC. The direct information transfer message may include the RIM information. At step S150, the RNC transmits a direct information transfer message to the SGSN, as a response to the direct information transfer message received from the SGSN. The direct information transfer message may include RIM information including the UTRAN cell load information. At step S160, upon receiving the direct information transfer message, the SGSN transmits a RAN information relay message including the UTRAN cell load information to the MME.

At step S170, the MME transmits an MME direct information transfer message including the UTRAN cell load information to the eNB2. The MME direct information transfer message may be transmitted via the S1 interface. The MME direct information transfer message may include the UTRAN cell ID. Specifically, the MME direct information transfer message may include an SON transfer request IE including the UTRAN cell ID.

At step S180, the eNB2 delivers the UTRAN cell load information to the eNB1 by using a resource status response message or a resource status update message. The resource status response message or a resource status update message may include the UTRAN cell ID.

Figure 14:
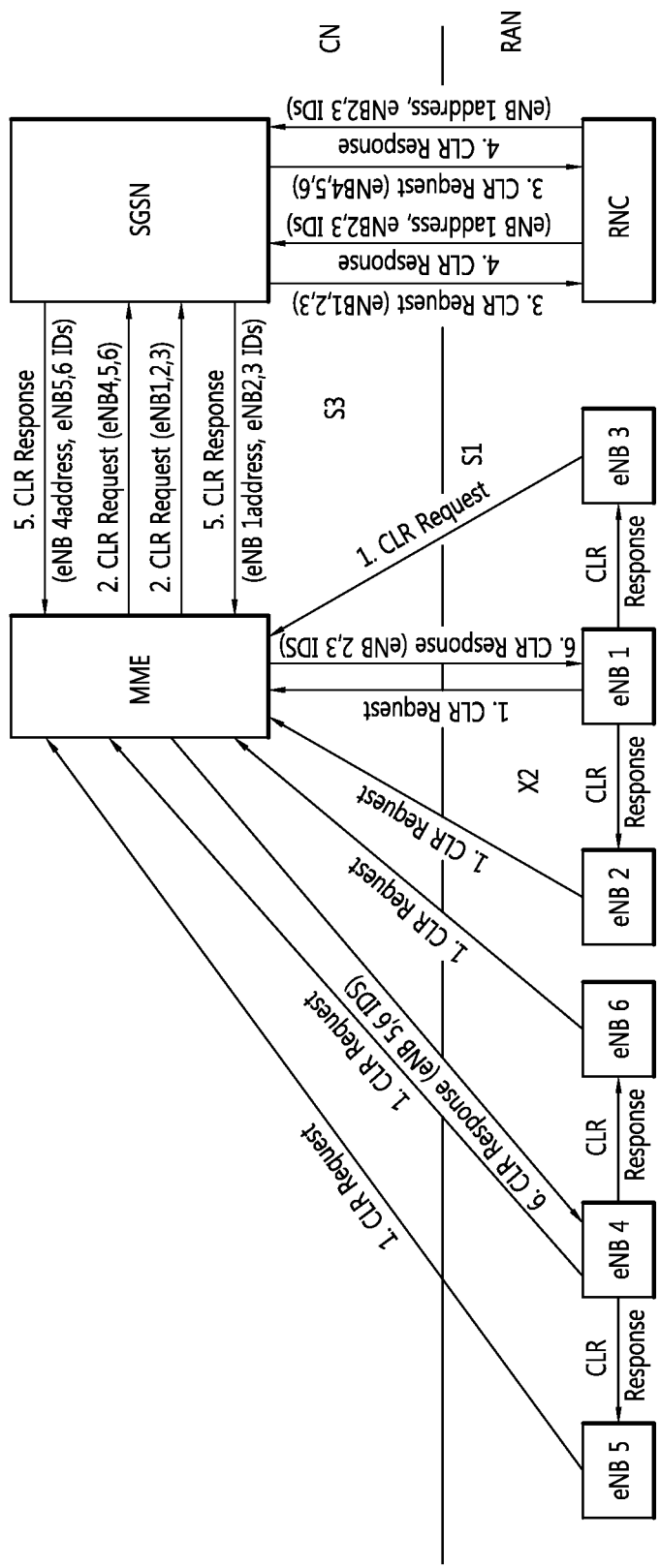
FIG. 14 shows another example of transmitting load information according to an embodiment of the present invention.

FIG. 14 shows another example of transmitting load information according to an embodiment of the present invention.

Referring to FIG. 14, each eNB (eNB1, 2, 3, 4, 5 and 6) requests cell load from the RNC using existing RIM procedure. The RNC transmits one combined cell load reporting if all the eNBs request same event threshold. The RNC reports the cell load reporting via RAN information to one eNB, and this eNB forwards the cell load reporting to other eNB via the X2 interface. In this case, the RNC adds the global eNB IDs of eNB2, 3 into the RIM PDU transmitted to the eNB1, and the RNC adds the global eNB IDs of eNBs 5, 6 into the RIM PDU transmitted to the eNB4. In FIG. 14, the RNC transmits a first cell load reporting including an address of the eNB1 and IDs of the eNB2 and eNB3. The eNB1 forwards the cell load reporting to the eNB2 and eNB3. In addition, the RNC transmits a second cell load reporting including an address of the eNB4 and IDs of the eNB5 and eNB6. The eNB4 forwards the cell load reporting to the eNB5 and eNB6. The eNBs may get the routing information in an SON transfer container.

According to the embodiment of the present invention described above, the duplicated event triggering UTRAN cell load reporting in Iu, S3 and S1 interfaces may be reduced. There is a configuration need to know and group the eNBs 1~3 and the eNBs 4~6 that need the same load information from the same UMTS RNC. In order to reduce the load response messages, when the event of requested report level happens, the RNC should aggregate the load response to the eNBs which request the corresponding report level. The signaling reduction level depends on the number of eNBs with the same requested report level. The neighboring eNBs of the UTRAN cell should also be grouped. RNC will group the eNBs according to an operation, administration, and maintenance (OAM) configuration and whether the same reporting level is requested by these eNBs.

Figure 15:
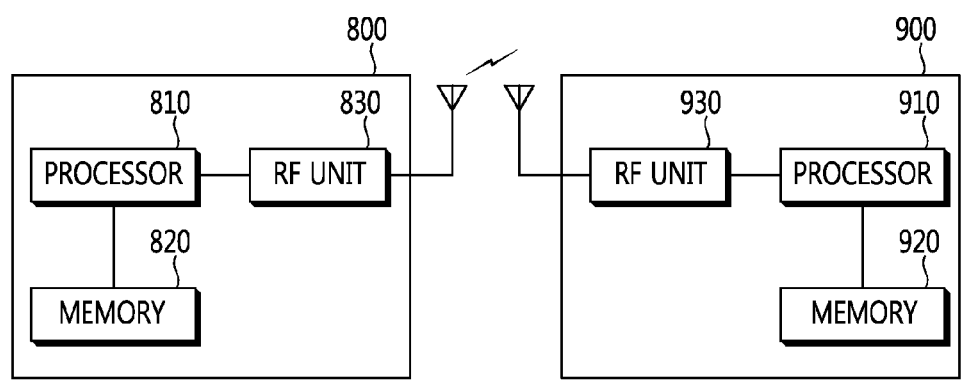
FIG. 15 is a block diagram showing wireless communication system to implement an embodiment of the present invention.

FIG. 15 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An MME or an eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first eNodeB (eNB) of a first system, cell load information in a wireless communication system, the method comprising:
    receiving a resource status request message including an ID of a cell in a second system from at least one second eNB of the first system; and
    if the first eNB does not have first cell load information,
        receiving second cell load information from a radio network controller (RNC) of the second system, and
        transmitting the received second cell load information to the at least one second eNB of the first system,
    wherein the first cell load information is information that includes load information of the cell in the second system corresponding to the ID of the cell in the second system which is included in the resource status request message, and the first cell load information is received from the RNC of the second system before the resource status request message is received,
    wherein the second cell load information is information that includes load information of the cell in the second system corresponding to the ID of the cell in the second system which is included in the resource status request message, and the second cell load information is received from the RNC of the second system in response to the resource status request message.

2. The method of claim 1, wherein the second cell load information of the cell in the second system is received using a mobility management entity (MME) direct information transfer message via an S1 interface, and
    wherein the second cell load information of the cell in the second system is received from the RNC via an MME and a serving GPRS support node (SGSN).

3. The method of claim 1, wherein the second cell load information of the cell in the second system includes an ID of the at least one second eNB of the first system.

4. The method of claim 1, wherein the received second cell load information is transmitted using a resource status response message or using a resource status update message via an X2 interface.

5. The method of claim 1, further comprising:
    transmitting a resource status response message indicating whether the first cell load information is available.

6. The method of claim 5, wherein the resource status request message is received via an X2 interface, and
    wherein the resource status response message is transmitted via the X2 interface.

7. The method of claim 1, wherein the resource status request message includes a request for reporting cell load information in an event-triggered manner,
    wherein the cell load information is at least one of the first cell load information or the second cell load information.

8. The method of claim 5, wherein the resource status response message includes the first cell load information of the cell in the second system, if the cell load information is available.

9. The method of claim 1, further comprising:
    transmitting the first cell load information to the at least one second eNB of the first system, if the first eNB has the first cell load information.

10. A first eNodeB (eNB) of a first system in a wireless communication system, the first eNB comprising:
    a radio frequency (RF) unit for transmitting or receiving a radio signal; and
    a processor coupled to the RF unit, that:
    controls the RF unit to receive a resource status request message including an ID of a cell in a second system from at least one second eNB of the first system; and
    if the first eNB does not have first cell load information,
        controls the RF unit to receive the second cell load information from a radio network controller (RNC) of the second system, and
        controls the RF unit to transmit the received second cell load information to the at least one second eNB of the first system,
    wherein the first cell load information is information that includes load information of the cell in the second system corresponding to the ID of the cell in the second system which is included in the resource status request message, and the first cell load information is received from the RNC of the second system before the resource status request message is received,
    wherein the second cell load information is information that includes load information of the cell in the second system corresponding to the ID of the cell in the second system which is included in the resource status request message, and the second cell load information is received from the RNC of the second system in response to the resource status request message.

11. The first eNB of claim 10, wherein the second cell load information of the cell in the second system is received using a mobility management entity (MME) direct information transfer message via an S1 interface, and
    wherein the second cell load information of the cell in the second system is received from the RNC via an MME and a serving GPRS support node (SGSN).

12. The first eNB of claim 10, wherein the second cell load information of the cell in the second system includes an ID of the at least one second eNB of the first system.

13. The first eNB of claim 10, wherein the received second cell load information is transmitted using a resource status response message or using a resource status update message via an X2 interface.

14. The first eNB of claim 10, wherein the processor further:
    controls the RF unit to transmit a resource status response message indicating whether the first cell load information is available.

15. The first eNB of claim 10, wherein the processor further:

controls the RF unit to transmit the first cell load information to the at least one second eNB of the first system, if the first eNB has the first cell load information.

* * * * *